(12) United States Patent
Allicock et al.

(10) Patent No.: US 12,427,815 B2
(45) Date of Patent: Sep. 30, 2025

(54) WORK VEHICLE AND ATTACHMENT UNIT INCLUDED IN WORK VEHICLE

(71) Applicant: KUBOTA CORPORATION, Osaka (JP)

(72) Inventors: Nicholas Allicock, Gainesville, GA (US); Michael Anderson, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 256 days.

(21) Appl. No.: 18/088,987

(22) Filed: Dec. 27, 2022

(65) Prior Publication Data

US 2024/0208284 A1    Jun. 27, 2024

(51) Int. Cl.
*B60D 1/18* (2006.01)
(52) U.S. Cl.
CPC .................................. *B60D 1/185* (2013.01)
(58) Field of Classification Search
CPC .................................. B60D 1/38; B60D 1/185
See application file for complete search history.

(56) References Cited

U.S. PATENT DOCUMENTS

| | | | | |
|---|---|---|---|---|
| 5,593,139 | A * | 1/1997 | Julian | B60R 9/06 224/521 |
| 7,344,120 | B2 * | 3/2008 | McFarland | B66D 1/00 254/323 |
| 10,603,966 | B2 * | 3/2020 | Stojkovic | B60D 1/185 |
| 11,794,534 | B2 * | 10/2023 | Fukayo | E02F 3/96 |
| 2006/0201980 | A1 * | 9/2006 | Koons | B60D 1/58 254/323 |
| 2017/0217267 | A1 * | 8/2017 | Vetkos | B66D 1/28 |
| 2018/0090953 | A1 * | 3/2018 | Hall | B66D 1/12 |
| 2021/0086843 | A1 | 3/2021 | Ishii et al. | |

* cited by examiner

*Primary Examiner* — Valentin Neacsu
*Assistant Examiner* — Hosam Shabara
(74) *Attorney, Agent, or Firm* — GREENBLUM & BERNSTEIN, P.L.C.

(57) ABSTRACT

A work vehicle includes: a body; a winch; and an attachment unit configured to attach the winch to the body and including: at least one bracket on the body; and a winch mount which is attachable to and detachable from the at least one bracket and to which the winch is fixed.

7 Claims, 6 Drawing Sheets

WORK VEHICLE AND ATTACHMENT UNIT INCLUDED IN WORK VEHICLE

TECHNICAL FIELD

The present disclosure relates to a work vehicle such as a utility terrain vehicle (UTV) including a body with a carrier box.

BACKGROUND ART

UTVs are used as four-wheel drive off-road vehicles for multiple purposes such as farmwork and transportation. A UTV may include a carrier box configured such that a front portion thereof is liftable for a slanted position in response to an operation of a dump cylinder.

US2021/0086843A1, for example, discloses a work vehicle in the form of a UTV including a carrier box with a rear gate disposed at the back end thereof and capable of being opened and closed. The work vehicle includes a single handle outward of a central portion of the rear gate. The rear gate is structured such that a user facing the rear gate can pull the handle toward the user to unlock the rear gate. With the rear gate unlocked as such, the user can cause the rear gate to fall into a horizontal position, in which the carrier box can receive various objects as loaded thereon.

SUMMARY OF INVENTION

Such a UTV may be provided with a winch configured to pull a heavy object onto the carrier box and another winch configured to pull a work vehicle or the like; a single UTV may need to be provided with a plurality of winches. Such use of a plurality of winches is, however, unfortunately costly, and requires time-consuming maintenance. There has been a demand for a work vehicle that need not be provided with a plurality of winches.

In view of the above, a work vehicle according to the present disclosure includes: a body; a winch; and an attachment unit configured to attach the winch to the body and including: at least one bracket on the body; and a winch mount which is attachable to and detachable from the at least one bracket and to which the winch is fixed.

BRIEF DESCRIPTION OF DRAWINGS

The present disclosure is further described in the detail description which follows, in reference to the noted plurality of drawings by way of non-limiting examples of exemplary embodiments of the present disclosure, in which like reference numerals represent similar parts throughout the several views of the drawings, and wherein.

DESCRIPTION OF EMBODIMENTS

Figure 1:
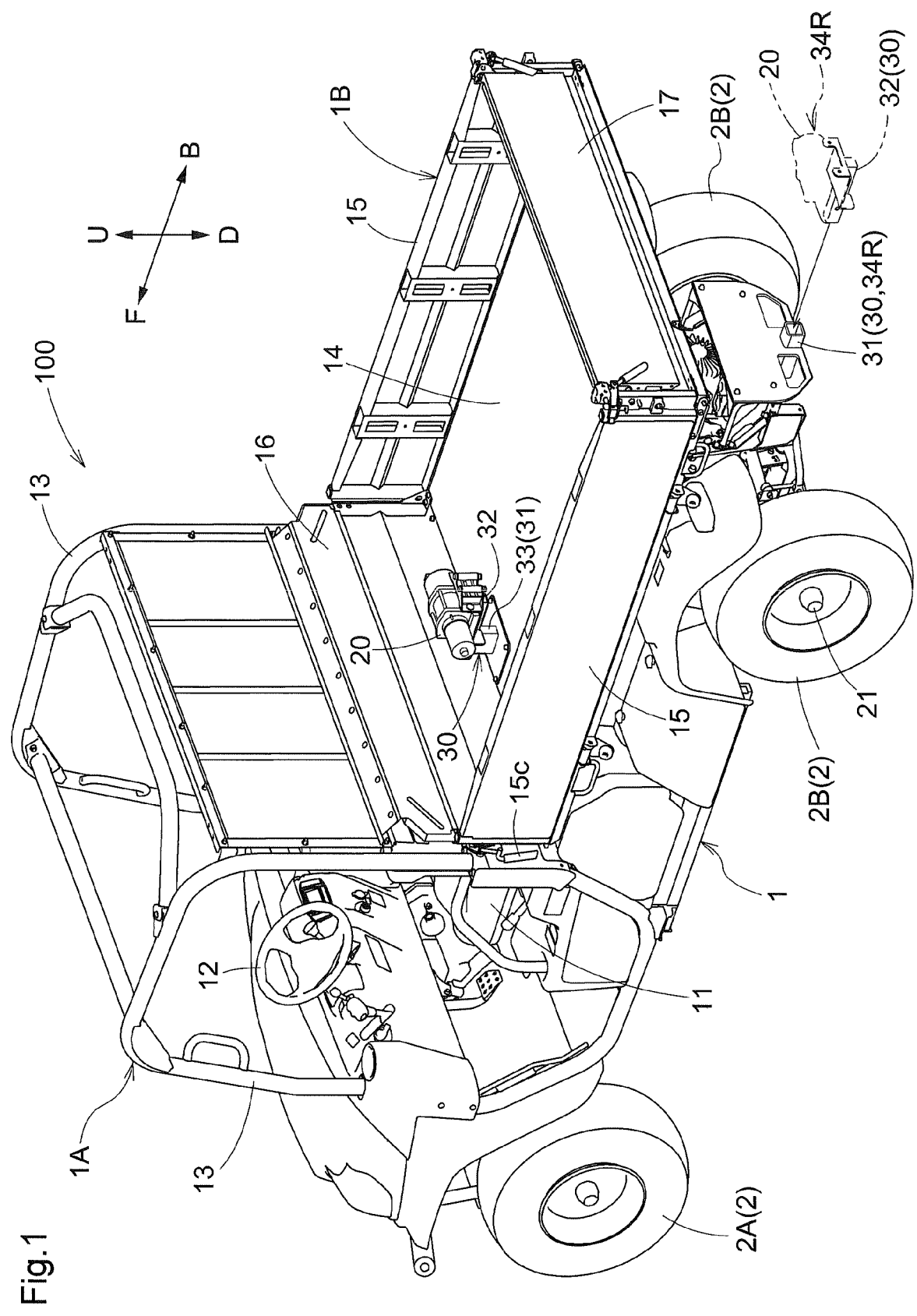
FIG. 1 is a view of a work vehicle in its entirety as viewed from obliquely backward.

The description below deals with a work vehicle as an embodiment of the present disclosure with reference to drawings. The present embodiment described below is, as an example work vehicle, a utility terrain vehicle (UTV) including a body with a carrier box. The present disclosure is, however, not limited to the embodiment below, and may be altered variously within its scope.

The description below uses terms such as "front" and "forward" to refer to the front side in the front-back direction of the body (indicated as "F" in the drawings), terms such as "back" and "backward" to refer to the back side in the front-back direction of the body (indicated as "B" in the drawings), terms such as "left-right direction" and "lateral" to refer to the horizontal direction perpendicular to the front-back direction of the body, terms such as "below" and "downward" to refer to the gravitational direction (indicated with "D" in the drawings), and terms such as "above" and "upward" to refer to the direction opposite to the gravitational direction (indicated with "U" in the drawings).

Figure 2:
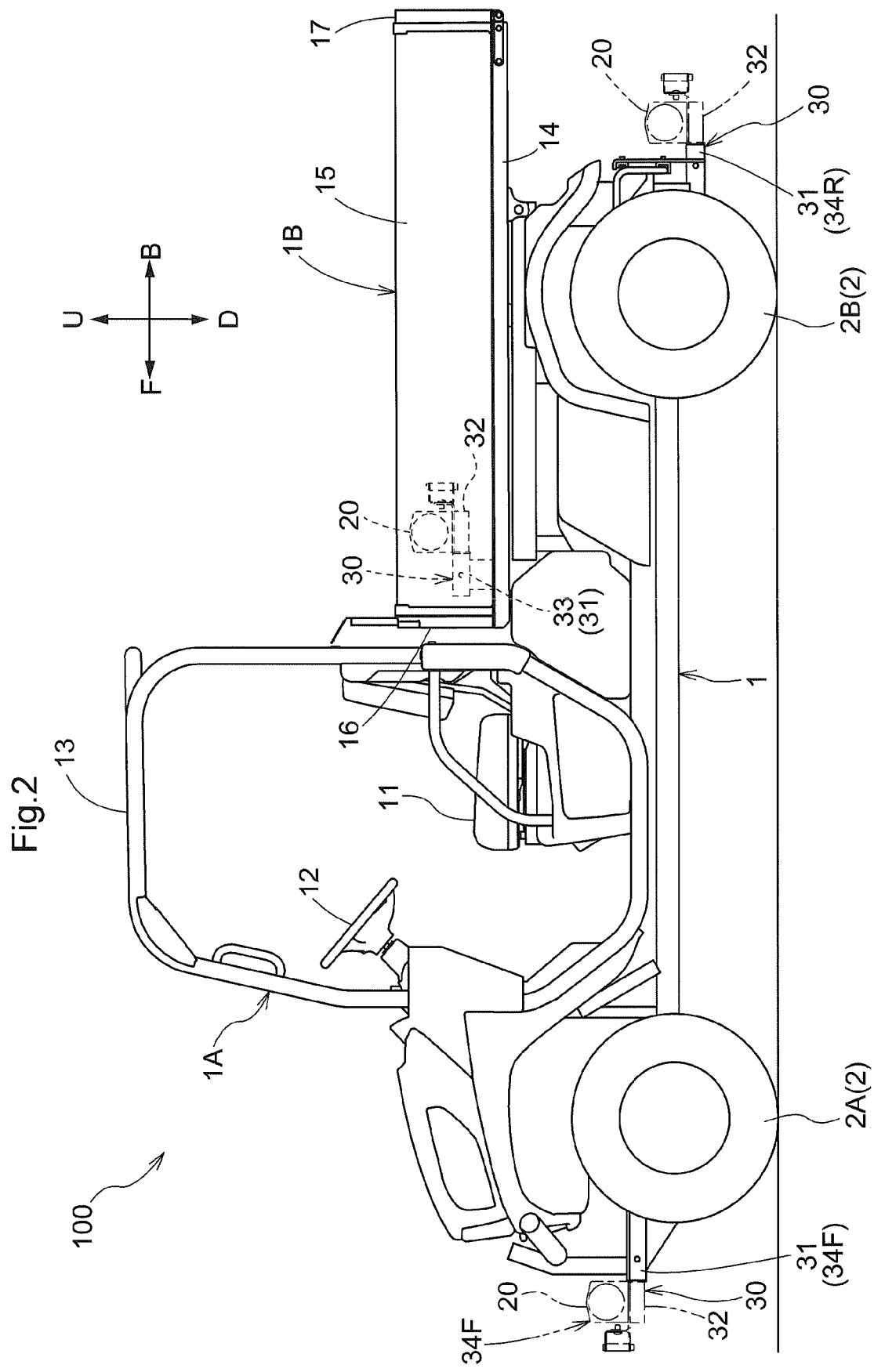
FIG. 2 is a side view of a work vehicle.

FIGS. 1 and 2 each illustrate a UTV 100 (which is an example of the "work vehicle") including a body 1 and four wheels 2 (namely, two front wheels 2A and two rear wheels 2B) each held by the body 1 with a suspension in-between. The UTV 100 is a four-wheel drive vehicle configured such that the wheels 2 are drivable by a power source such as a motor and an internal combustion engine. The UTV 100 is usable for multiple purposes such as farmwork and transportation.

The body 1 is provided with a pair of left and right front wheels 2A at a front portion and a pair of left and right rear wheels 2B at a back portion. The body 1 includes a driver section 1A backward of the front wheels 2A and a carrier box 1B backward of the driver section 1A. The carrier box 1B is configured such that a front portion thereof is liftable for a slanted position in response to an operation of a dump cylinder (not shown) to allow a load to be dumped backward by its self weight.

The driver section 1A includes a driver's seat 11 for a driver to sit on and a steering wheel 12 positioned forward of the driver's seat 11 and operable to turn the front wheels 2A. The driver section 1A further includes two ROPS frames 13 respectively at the left and right sides of the driver section 1A to protect the driver and any other occupant in the event of a roll-over accident of the body 1.

The carrier box 1B is an open-top box including (i) a floor panel 14 as a bottom wall, (ii) a pair of left and right side panels 15 connected with respective lateral sides of the floor panel 14, (iii) a front panel 16 connected with the front end of the floor panel 14, and (iv) a rear gate 17 connected with the back end of the floor panel 14. The floor panel 14 is a rectangular plate. The side panels 15 are connected respectively with the entire lateral sides of the floor panel 14. The front panel 16 is connected with the entire front side of the floor panel 14. The rear gate 17 is connected with the entire back side of the floor panel 14. The carrier box 1B for the present embodiment has a large capacity. Approximately two-thirds or smaller of its area lies forward of the rear axle 21 for the rear wheels 2B, while approximately one-third or larger of the area lies backward of the rear axle 21.

For normal use, the floor panel 14, the side panels 15, and the front panel 16 are so fixed as to be unmovable relative to one another, and the rear gate 17 is movable rotationally about the back end of the floor panel 14 as a rotary shaft. The rear gate 17 is capable of being restricted in its backward movement with use of a wire hung between a side panel 15 and the rear gate 17. The side panels 15 are each provided with a lock member 15c unlockable to allow the corresponding side panel 15 to move rotationally outward relative to the front panel 16.

The UTV 100 includes an attachment unit 30 configured to attach a winch 20 to the body 1. The attachment unit 30 includes a plurality of brackets 31 at different positions on the body 1 and a winch mount 32 which is attachable to and detachable from a bracket 31 and to which the winch 20 is fixed.

The carrier box 1B is provided with a cargo bracket 33 as one of the plurality of brackets 31 at a central position of the connection between the floor panel 14 and the front panel 16.

Figure 4:
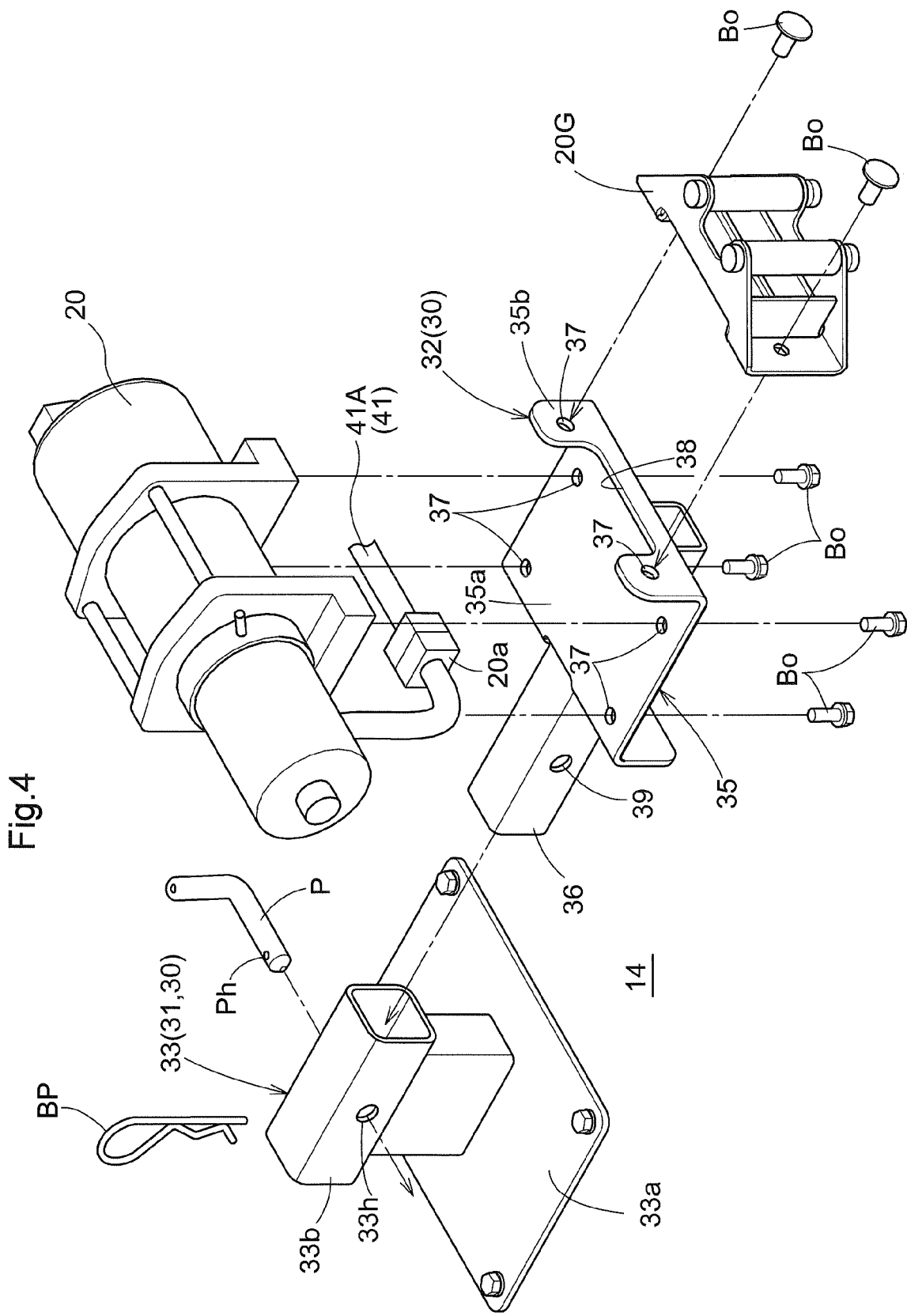
FIG. 4 is a diagram illustrating the configuration of an attachment unit.

As illustrated in FIG. 4, the cargo bracket 33 includes a bottom portion 33a bolted to the floor panel 14 and a support 33b which has the shape of an angular pipe extending in the front-back direction and to which the winch mount 32 (described later) is attachable.

Figure 3:
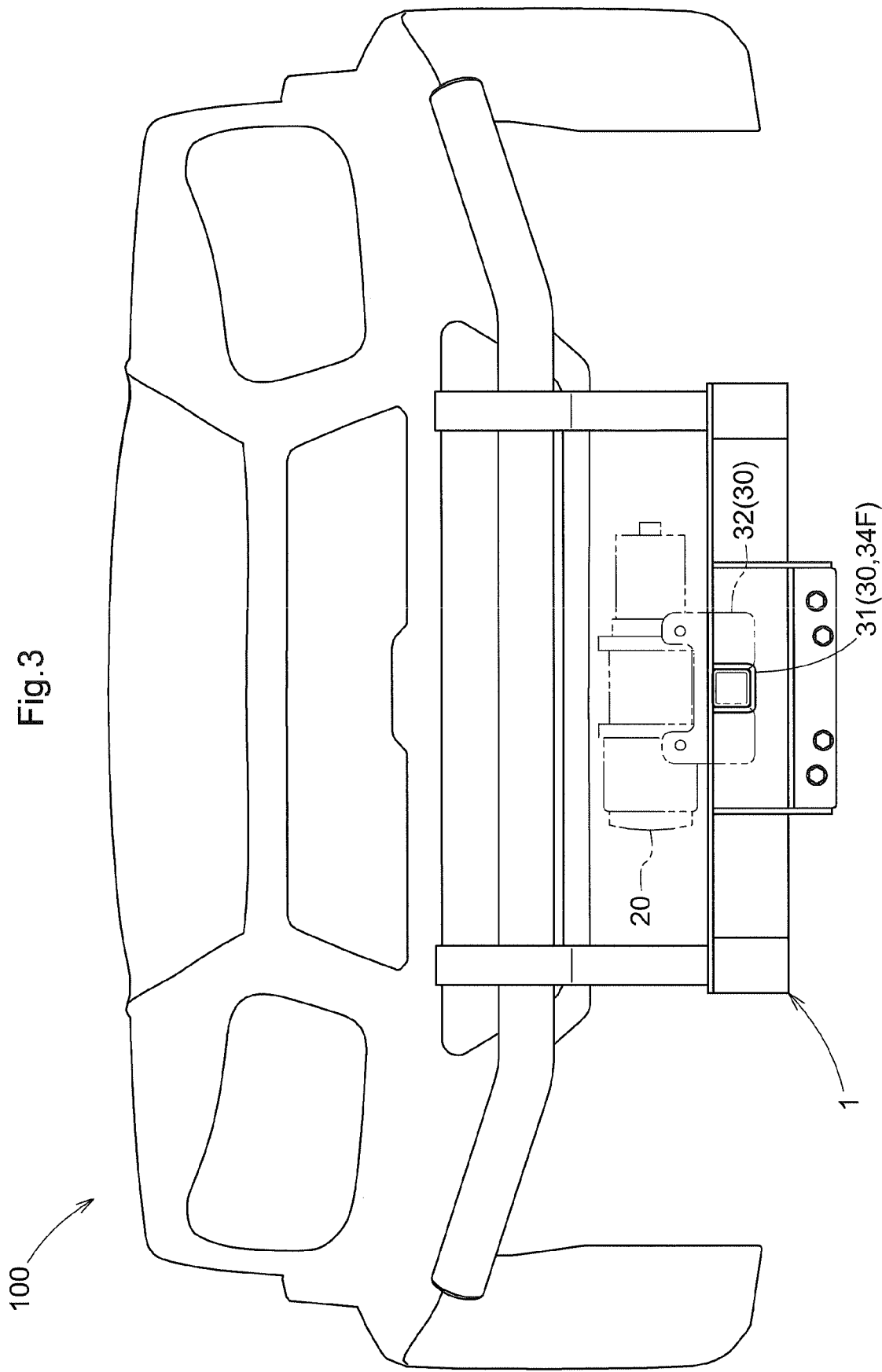
FIG. 3 is a front view of a work vehicle.

The UTV 100 is, as illustrated in FIGS. 1 to 3, provided with a front hitch 34F attached to a front end portion of the body 1 and a rear hitch 34R attached to a back end portion of the body 1. The front and rear hitches 34F and 34R each serve as a bracket 31 to pull an implement or the like (not shown). The present embodiment is, in other words, configured such that the body 1 includes front and rear hitches 34F and 34R as brackets 31.

As illustrated in FIG. 4, the winch mount 32 includes a fixing section 35 to which the winch 20 is fixed and a support portion 36 detachably supported by the cargo bracket 33.

The fixing section 35 includes a horizontal surface portion 35a in contact with the bottom face of the winch 20 and a vertical surface portion 35b in contact with a surface of the winch 20 which surface extends along the wire of the winch 20. The fixing section 35 is in the form of a plate bent into the horizontal surface portion 35a and the vertical surface portion 35b.

The horizontal surface portion 35a has four bolt holes 37. The winch 20 is fixed to the horizontal surface portion 35a with four bolts Bo through the respective bolt holes 37.

The vertical surface portion 35b has two bolt holes 37 arranged horizontally. The winch 20 is provided with a guide 20G fixed to the vertical surface portion 35b with two bolts Bo through the respective bolt holes 37 in the vertical surface portion 35b and configured to guide the wire of the winch 20. The vertical surface portion 35b has between the two bolt holes 37 a cutout 38 for the wire of the winch 20 to pass through. The bolt holes 37 and bolts Bo for the horizontal surface portion 35a may each be identical to or different from those for the vertical surface portion 35b in configuration.

The support portion 36 is in the form of an angular pipe insertable through the support 33b of the cargo bracket 33 as well as the front and rear hitches 34F and 34R.

The support portion 36 has a pair of insertion holes 39 through which a fixing pin P is insertable. The support 33b also has a pair of insertion holes 33h through which the fixing pin P is insertable. The fixing pin P is bent at a portion on the back side relative to the direction in which the fixing pin P is inserted. A worker is able to hold the bent portion to easily insert and pull out the fixing pin P.

When attaching the winch mount 32 to the cargo bracket 33, a worker inserts the fixing pin P through the insertion holes 39 in the support portion 36 and the insertion holes 33h in the support 33b. The worker then inserts a beta pin BP through a pin hole Ph in the fixing pin P to prevent the fixing pin P from coming off and fix the winch mount 32 to the cargo bracket 33.

The winch 20 is drivable on electric power supplied from a battery 40 (see FIG. 5) via a harness 41.

The UTV 100 includes a harness 41A extending from the body 1 toward the cargo bracket 33. When attaching the winch mount 32 with the winch 20 to the cargo bracket 33, a worker connects the harness 41A with a coupler 20a of the winch 20.

As a brief description, the UTV 100 also includes a harness 41B extending toward the front hitch 34F and a harness 41C extending toward the rear hitch 34R. When attaching the winch mount 32 with the winch 20 to the front hitch 34F, the worker connects the harness 41B with the coupler 20a. When attaching the winch mount 32 with the winch 20 to the front hitch 34R, the worker connects the harness 41C with the coupler 20a.

Figure 5:
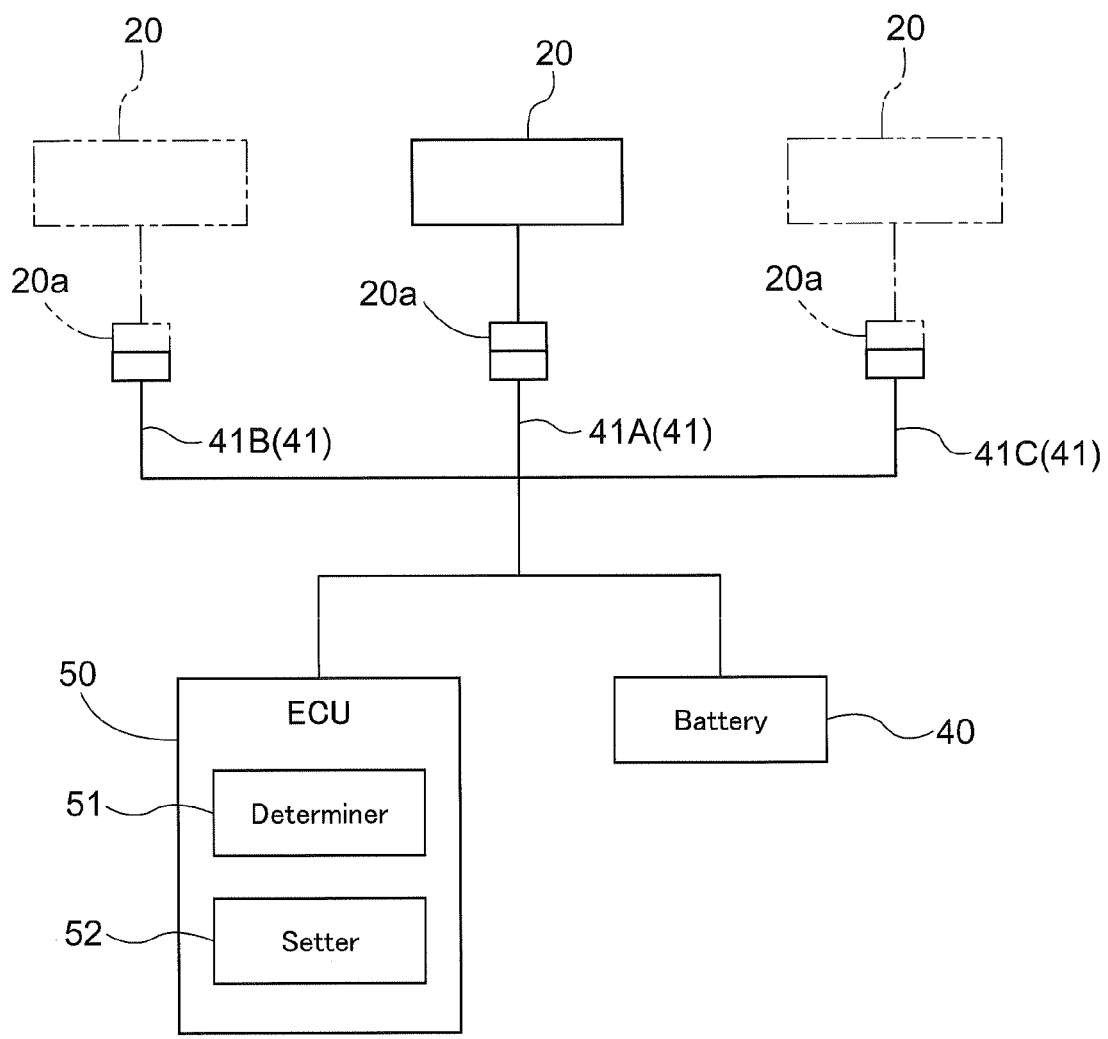
FIG. 5 is a block diagram illustrating the electric system of a work vehicle.

As illustrated in FIG. 5, the UTV 100 includes a determiner 51 configured to determine which of the harnesses 41A, 41B, and 41C is connected with the coupler 20a. This makes it possible to determine which of the brackets 31 is supporting the support portion 36. The determiner 51 is included in an electronic control unit (ECU) 50 on the body 1.

The ECU 50 also includes a setter 52 configured to set an upper limit on electric power for the winch 20 based on the result of the determination by the determiner 51. This makes it possible to adjust the traction torque of the winch 20 depending on where the winch 20 is attached.

Alternative Embodiments

The description below deals with example alternatives to the embodiment described above.

Figure 6:
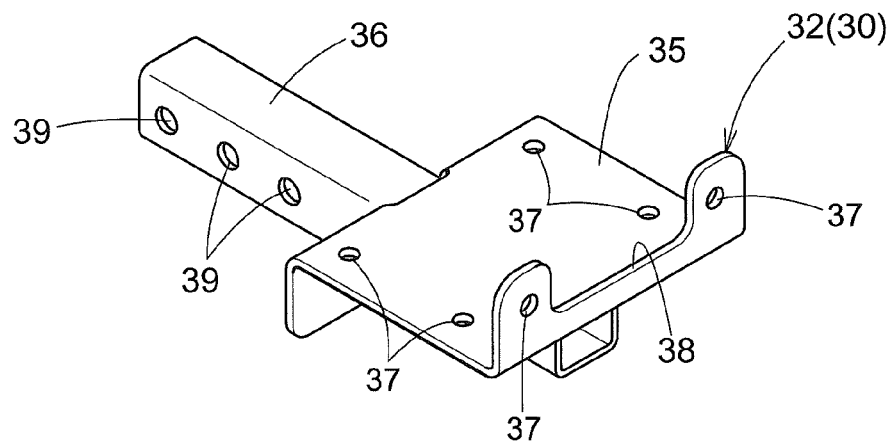
FIG. 6 is a diagram illustrating the configuration of a winch mount for an alternative embodiment.

(1) The winch mount 32 may, as illustrated in FIG. 6, include a support portion 36 having a plurality of pairs of insertion holes 39 arranged in the longitudinal direction of the support portion 36. This allows adjustment of how much the support portion 36 is inserted in the support 33b.

Figure 7:
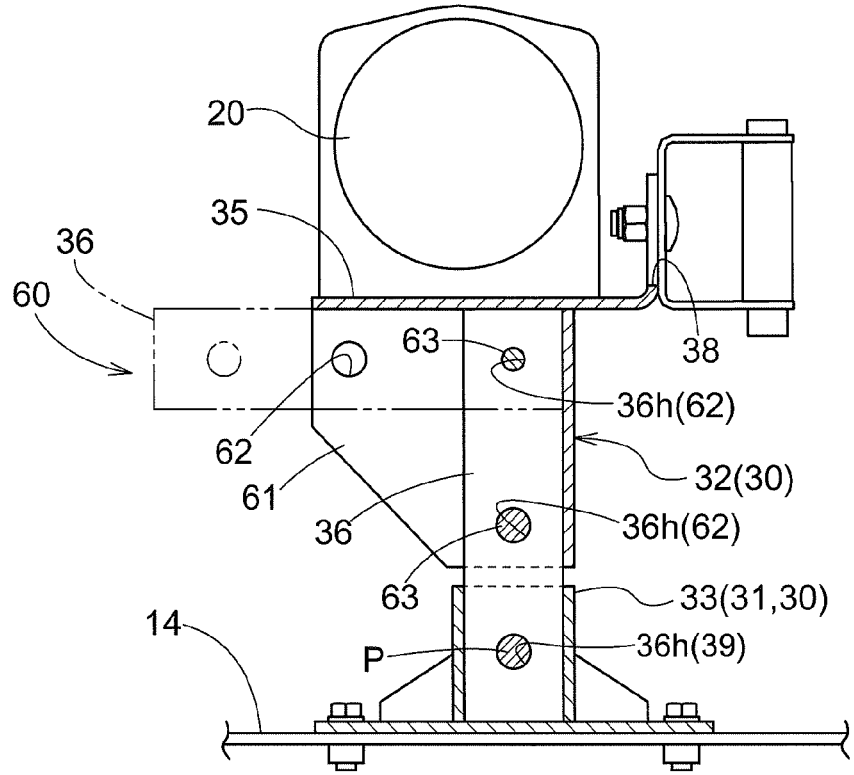
FIG. 7 is a diagram illustrating the configuration of an attachment unit for an alternative embodiment.

(2) The winch mount 32 may, as illustrated in FIG. 7, include an orientation changing mechanism 60 configured to change the orientation of the fixing section 35 relative to the support portion 36. The orientation changing mechanism 60 includes a coupling member 61 fixed to the fixing section 35, coupling the fixing section 35 with the support portion 36, and having three pairs of insertion holes 62. The orientation changing mechanism 60 also includes two fixing pins 63 insertable through two pairs of insertion holes 36h in the support portion 36 and two of the pairs of insertion holes 62. The fixing pins 63 are each equivalent in configuration to the fixing pin P, and are each capable of being prevented from coming off with use of a beta pin. The orientation changing mechanism 60 may alternatively include, for example, flat head pins or knob bolts instead of the fixing pins 63.

The insertion holes 62 are positioned to correspond to (i) the two pairs of insertion holes 36h in the support portion 36 perpendicular to the fixing section 35 and (ii) the two pairs of insertion holes 36h in the support portion 36 parallel to the fixing section 35.

The above configuration allows a worker to orient the support portion 36 perpendicularly or parallel to the fixing section 35 and then insert the fixing pins 63 through those two pairs of insertion holes 62 which correspond to the new orientation as well as the insertion holes 36h to change the orientation of the support portion 36 relative to the fixing section 35.

The orientation changing mechanism 60 may alternatively have a shaft and two pairs of insertion holes 62 instead of the three pairs of insertion holes 62. The shaft supports the support portion 36 in such a manner that the support portion 36 is rotatable relative to the fixing section 35. One of the two pairs of insertion holes 62 is positioned to correspond to a single pair of insertion holes 36*h* in the support portion 36 when the support portion 36 is perpendicular to the fixing section 35, whereas the other of the two pairs of insertion holes 62 is positioned to correspond to the single pair of insertion holes 36*h* in the support portion 36 when the support portion 36 is parallel to the fixing section 35.

(3) The embodiment described above is an example in which the attachment unit 30 includes a plurality of brackets 31. The attachment unit 30 may alternatively include a single bracket 31.

(4) The embodiment described above is an example in which the support portion 36 is in the form of an angular pipe. The present disclosure is, however, not limited to such a configuration. The support portion 36 may alternatively be in the form of a circular pipe.

(5) The embodiment described above is an example in which the determiner 51 is configured to determine which of the harnesses 41 is connected with the coupler 20*a* of the winch 20 to determine which of the brackets 31 is supporting the support portion 36. The present disclosure is, however, not limited to such a configuration; for instance, the brackets 31 may be each provided with a sensor or the like for determination of which of the brackets 31 is supporting the support portion 36.

(6) The embodiment described above is an example in which the support portion 36 is fixed to the support 33*b* with use of a fixing pin P. The present disclosure is, however, not limited to such a configuration. The fixing pin P may be replaced with, for example, a flat head pin or a knob bolt.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

INDUSTRIAL APPLICABILITY

The present invention is applicable to not only tractors but also various electric work vehicles such as combines, rice transplanters, and construction machines.

REFERENCE SIGNS LIST

1 Vehicle body
1B Carrier box
30 Attachment unit
31 Bracket
33*b* Support
34F Front hitch (hitch)
34R Rear hitch (hitch)
35 Fixing section
36 Support portion
38 Cutout
51 Determiner
52 Setter
60 Orientation changing mechanism

The invention claimed is:

1. A work vehicle, comprising:
a body;
a winch;
an attachment unit configured to attach the winch to the body and including:
a plurality of brackets at different positions on the body; and
a winch mount which is attachable to and detachable from the plurality of brackets and to which the winch is fixed, and
a determiner configured to determine which of the plurality of brackets is supporting the winch mount.

2. The work vehicle according to claim 1, further comprising:
a carrier box at a back portion of the body, wherein
the at least one bracket includes a cargo bracket on the carrier box.

3. The work vehicle according to claim 1, wherein
the at least one bracket includes a hitch at a front portion of the body.

4. The work vehicle according to claim 1, wherein
the at least one bracket includes a hitch at a back portion of the body.

5. The work vehicle according to claim 1, further comprising:
a setter configured to set an upper limit on an electric current for the winch based on a result of the determination by the determiner.

6. An attachment unit configured to attach a winch to a vehicle body,
the attachment unit comprising:
a bracket on the vehicle body; and
a winch mount detachably supported by the bracket and including:
a fixing section configured to hold the winch; and
a support portion detachably supported by the bracket, wherein
the fixing section includes a horizontal surface portion and a vertical surface portion,
the vertical surface portion is operable to support a guide, and
the vertical surface portion has a cutout for a wire of the winch to pass through.

7. The attachment unit according to claim 6, wherein
the winch mount further includes an orientation changing mechanism configured to change an orientation of the fixing section relative to the support portion.

* * * * *